(12) United States Patent
Mizumukai

(10) Patent No.: US 7,979,892 B2
(45) Date of Patent: Jul. 12, 2011

(54) PERIPHERAL DEVICE

(75) Inventor: Wataru Mizumukai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 866 days.

(21) Appl. No.: 11/605,294

(22) Filed: Nov. 29, 2006

(65) Prior Publication Data

US 2007/0136293 A1 Jun. 14, 2007

(30) Foreign Application Priority Data

Nov. 29, 2005 (JP) ................................. 2005-344269

(51) Int. Cl.
*G06F 17/30* (2006.01)

(52) U.S. Cl. ................ 726/2; 726/26; 726/27; 713/181; 713/186; 713/187

(58) Field of Classification Search ........................ 726/2
See application file for complete search history.

(56) References Cited

U.S. PATENT DOCUMENTS

| | | | | | |
|---|---|---|---|---|---|
| 3,828,325 | A | * | 8/1974 | Stafford et al. ................. | 710/63 |
| 5,479,603 | A | * | 12/1995 | Stone et al. .................... | 715/804 |
| 5,870,683 | A | * | 2/1999 | Wells et al. .................... | 455/566 |
| 6,917,373 | B2 | | 7/2005 | Vong et al. | |
| 7,593,122 | B2 | * | 9/2009 | Watanabe et al. ............. | 358/1.14 |
| 2002/0015175 | A1 | * | 2/2002 | Katsuda ........................ | 358/1.15 |
| 2002/0030743 | A1 | * | 3/2002 | Inui ................................ | 348/195 |
| 2004/0156068 | A1 | * | 8/2004 | Yoshida et al. ............... | 358/1.13 |
| 2005/0210259 | A1 | * | 9/2005 | Richardson .................... | 713/179 |
| 2006/0001900 | A1 | * | 1/2006 | Watanabe et al. ............. | 358/1.14 |
| 2007/0006324 | A1 | * | 1/2007 | Osada et al. .................... | 726/27 |
| 2007/0107042 | A1 | * | 5/2007 | Corona ............................ | 726/2 |
| 2007/0124516 | A1 | * | 5/2007 | Ohara et al. .................... | 710/62 |
| 2007/0136293 | A1 | * | 6/2007 | Mizumukai ....................... | 707/9 |
| 2007/0226778 | A1 | * | 9/2007 | Pietruszka ........................ | 726/2 |
| 2008/0005579 | A1 | * | 1/2008 | Gaines et al. .................. | 713/186 |
| 2008/0086778 | A1 | * | 4/2008 | Asahara .......................... | 726/26 |

(Continued)

FOREIGN PATENT DOCUMENTS

JP 6-22068 A 1/1994

(Continued)

OTHER PUBLICATIONS

JP Office Action dtd Apr. 20, 2010, JP Appln. 2005-344269, English translation.

*Primary Examiner* — Kambiz Zand
*Assistant Examiner* — Yonas Bayou
(74) *Attorney, Agent, or Firm* — Banner & Witcoff, Ltd.

(57) ABSTRACT

A peripheral device having one or more functions comprises: an input unit letting a user input identification information; function selection buttons each of which is previously associated with one of the functions and can be operated for selecting the associated function; a usage permission information storing unit previously storing usage permission information (indicating whether the use of each function has been permitted or not) while associating it with the identification information on each user; and a notification unit notifying the user whether the user is permitted to use each function or not when the identification information is inputted, by displaying the function selection buttons regarding functions that the user has been permitted to use and the function selection buttons regarding functions that the user has not been permitted to use in different styles discriminable from each other based on the usage permission information associated with the inputted identification information.

13 Claims, 11 Drawing Sheets

| | 5a | 5b | 5b' | | 5e | |
|---|---|---|---|---|---|---|
| IDENTIFICATION INFORMATION | FUNCTION (LEVEL 1) | FUNCTION PERMISSION/ PROHIBITION (YES/NO) | FUNCTION SETTING ITEM (LEVEL 2) | FUNCTION SETTING PERMISSION/PROHIBITION (YES/NO) | DETAILED SETTING ITEM (LEVEL 3) | DETAILED SETTING PERMISSION/PROHIBITION (YES/NO) |
| USER #3 | FAX | YES | FAX RECEPTION SETTING | NO | -- | - |
| | | | FAX TRANSMISSION SETTING | YES | PRINT DENSITY | YES |
| | | | | | FAX IMAGE QUALITY | YES |
| | | | TELEPHONE DIRECTORY REGISTRATION | YES | ONE-TOUCH DIALING REGISTRATION | YES |
| | | | | | SPEED DIALING REGISTRATION | YES |
| | | | | | GROUP DIALING REGISTRATION | NO |
| | | | COMMUNICATION SETTING | NO | - | - |
| | SCAN | NO | - | - | - | - |
| | COPY | NO | - | - | - | - |

U.S. PATENT DOCUMENTS

2008/0130041 A1* 6/2008 Asahara .................. 358/1.15

FOREIGN PATENT DOCUMENTS

| JP | 6-130766 A | 5/1994 |
| JP | 11-134136 A | 5/1999 |
| JP | 2001-306204 A | 11/2001 |
| JP | 2002-152446 A | 5/2002 |
| JP | 2003-229978 A | 8/2003 |
| JP | 2005-45427 A | 2/2005 |
| JP | 2005-300605 A | 10/2005 |

* cited by examiner

| NAME | FUNCTION | FUNCTION PERMISSION/ PROHIBITION(YES/NO) |
|---|---|---|
| USER #1 | FAX | YES |
|  | SCAN | YES |
|  | COPY | NO |
| USER #2 | FAX | NO |
|  | SCAN | NO |
|  | COPY | YES |
| USER #3 | FAX | YES |
|  | SCAN | NO |
|  | COPY | NO |
| USER #4 | FAX | NO |
|  | SCAN | YES |
|  | COPY | YES |

5b

| IDENTIFICATION INFORMATION (PASSWORD) | NAME |
|---|---|
| ○○○○ | USER #1 |
| △△△△ | USER #2 |
| ×××× | USER #3 |

FIG.5A

| NAME | FUNCTION | FUNCTION PERMISSION/ PROHIBITION(YES/NO) | |
|---|---|---|---|
| PATTERN #1 | FAX | YES | 5c |
| | SCAN | YES | |
| | COPY | YES | |
| PATTERN #2 | FAX | YES | 5c |
| | SCAN | YES | |
| | COPY | NO | |
| PATTERN #3 | FAX | YES | 5c |
| | SCAN | NO | |
| | COPY | YES | |
| PATTERN #4 | FAX | NO | 5c |
| | SCAN | YES | |
| | COPY | YES | |
| PATTERN #5 | FAX | YES | 5c |
| | SCAN | NO | |
| | COPY | NO | |
| PATTERN #6 | FAX | NO | 5c |
| | SCAN | YES | |
| | COPY | NO | |
| PATTERN #7 | FAX | NO | 5c |
| | SCAN | NO | |
| | COPY | YES | |
| PATTERN #8 | FAX | NO | 5c |
| | SCAN | NO | |
| | COPY | NO | |

(header cell labeled 5d)

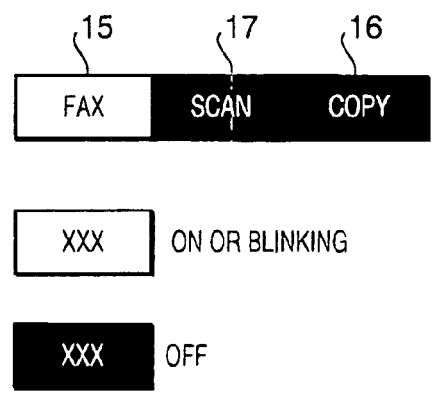

| NAME (5a) | PATTERN NAME (5b) |
|---|---|
| USER #1 | PATTERN #2 |
| USER #2 | PATTERN #7 |
| USER #3 | PATTERN #5 |
| USER #4 | PATTERN #4 |
| USER #5 | PATTERN #1 |

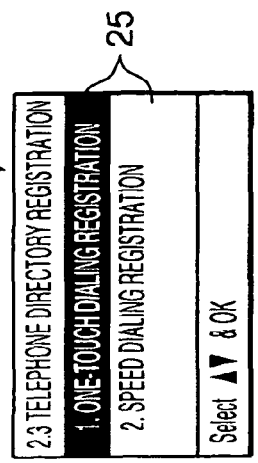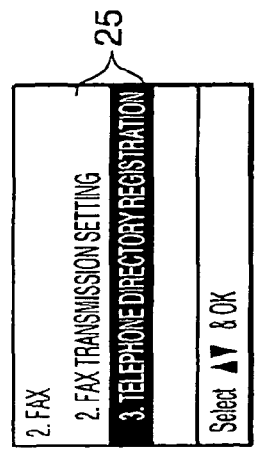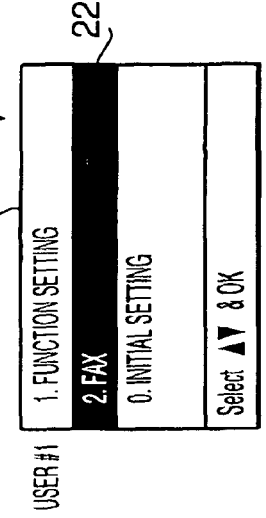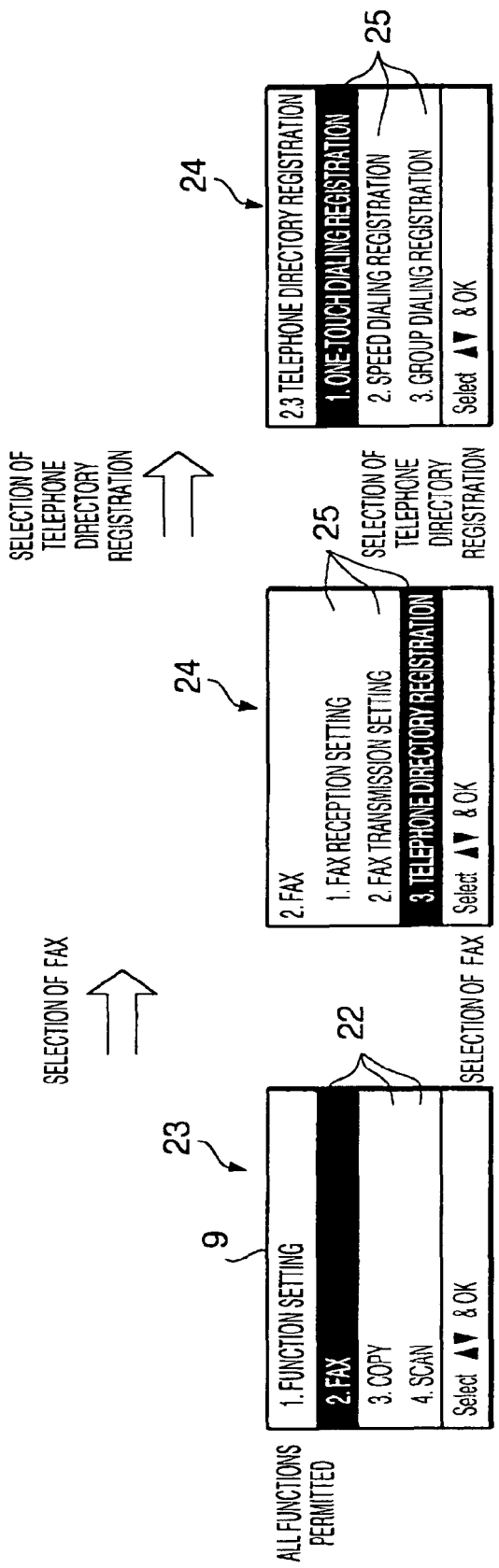

| IDENTIFICATION INFORMATION | FUNCTION (LEVEL 1) | FUNCTION PERMISSION/ PROHIBITION (YES/NO) | FUNCTION SETTING ITEM (LEVEL 2) | FUNCTION SETTING PERMISSION/PROHIBITION (YES/NO) | DETAILED SETTING ITEM (LEVEL 3) | DETAILED SETTING PERMISSION/PROHIBITION (YES/NO) |
|---|---|---|---|---|---|---|
| USER #3 | FAX | YES | FAX RECEPTION SETTING | NO | - | - |
| | | | FAX TRANSMISSION SETTING | YES | PRINT DENSITY | YES |
| | | | | | FAX IMAGE QUALITY | YES |
| | | | TELEPHONE DIRECTORY REGISTRATION | YES | ONE-TOUCH DIALING REGISTRATION | YES |
| | | | | | SPEED DIALING REGISTRATION | YES |
| | | | | | GROUP DIALING REGISTRATION | NO |
| | | | COMMUNICATION SETTING | NO | - | - |
| | SCAN | NO | - | - | - | - |
| | COPY | NO | - | - | - | - |

PERIPHERAL DEVICE

CROSS REFERENCE TO RELATED APPLICATION

This application claims priority from Japanese Patent Application No. 2005-344269, filed on Nov. 29, 2005, the entire subject matter of which is incorporated herein by reference.

BACKGROUND

Technical Field

The present invention relates to a peripheral device having one or more functions.

Peripheral devices having multiple functions (copy function, facsimile function, printer function, etc.) are widely used today, and some of well-known peripheral devices are provided with functions of managing users and recording the details of the use of the peripheral device by the users by employing IDs, passwords, etc. In Japanese Patent Provisional Publication No. 2002-152446 (hereinafter referred to as a "patent document #1"), a peripheral device system capable of restricting usable functions depending on the user has been disclosed. The peripheral device system of the patent document #1 memorizes data representing functions available to each user as menu display data. When identification information on the current user (ID, password, etc.) is inputted by the user, the menu display data corresponding to the user is read out from memory and displayed on a display screen. The user can recognize usable functions (functions that the user is permitted to use) by viewing the menu display data displayed on the display screen.

In the above peripheral device system which memorizes the menu display data for each user, memory space necessary for storing the menu display data gets extremely larger as the number of users increases. Further, while all the functions available to the user can be displayed at once in a list format when the peripheral device has a large display screen, user operations for scroll display, switching display, etc. become necessary on a peripheral device having a small display screen in order to view all the usable functions and that is very inconvenient and troublesome to the user.

SUMMARY

The present invention which has been made in consideration of the above problems is advantageous in that a peripheral device, capable of restricting usable functions in regard to each user and letting the user easily recognize the usable functions (functions that the user is permitted to use) while needing only a small memory space for storing information on the availability/unavailability (permission/prohibition) of each function to each user even when there are a large number of registered users, can be provided.

BRIEF DESCRIPTION OF THE ACCOMPANYING DRAWINGS

The objects and features of the present invention will become more apparent from the consideration of the following detailed description taken in conjunction with the accompanying drawings.

FIG. 4B is a schematic diagram showing examples of display made by function selection buttons on the operation panel.

FIG. 5A is a table showing an example of information associating each permission/prohibition combination pattern (each piece of individual permission information) with a pattern name.

FIG. 5B is a schematic diagram showing an example of display made by the function selection buttons.

FIG. 5C is a table showing an example of information associating each pattern name with the identification information.

FIGS. 6A-6F are schematic diagrams showing examples of screens which are displayed for setting detailed information, in which FIGS. 6A-6C show screens for a user who has been permitted to use a FAX function only and FIGS. 6D-6F show screens for a user who has been permitted to use all functions.

FIG. 8 is a table showing an example of information associating setting permission information with the identification information, the usage permission information and function setting item information.

DETAILED DESCRIPTION

General Overview

Figure 1:
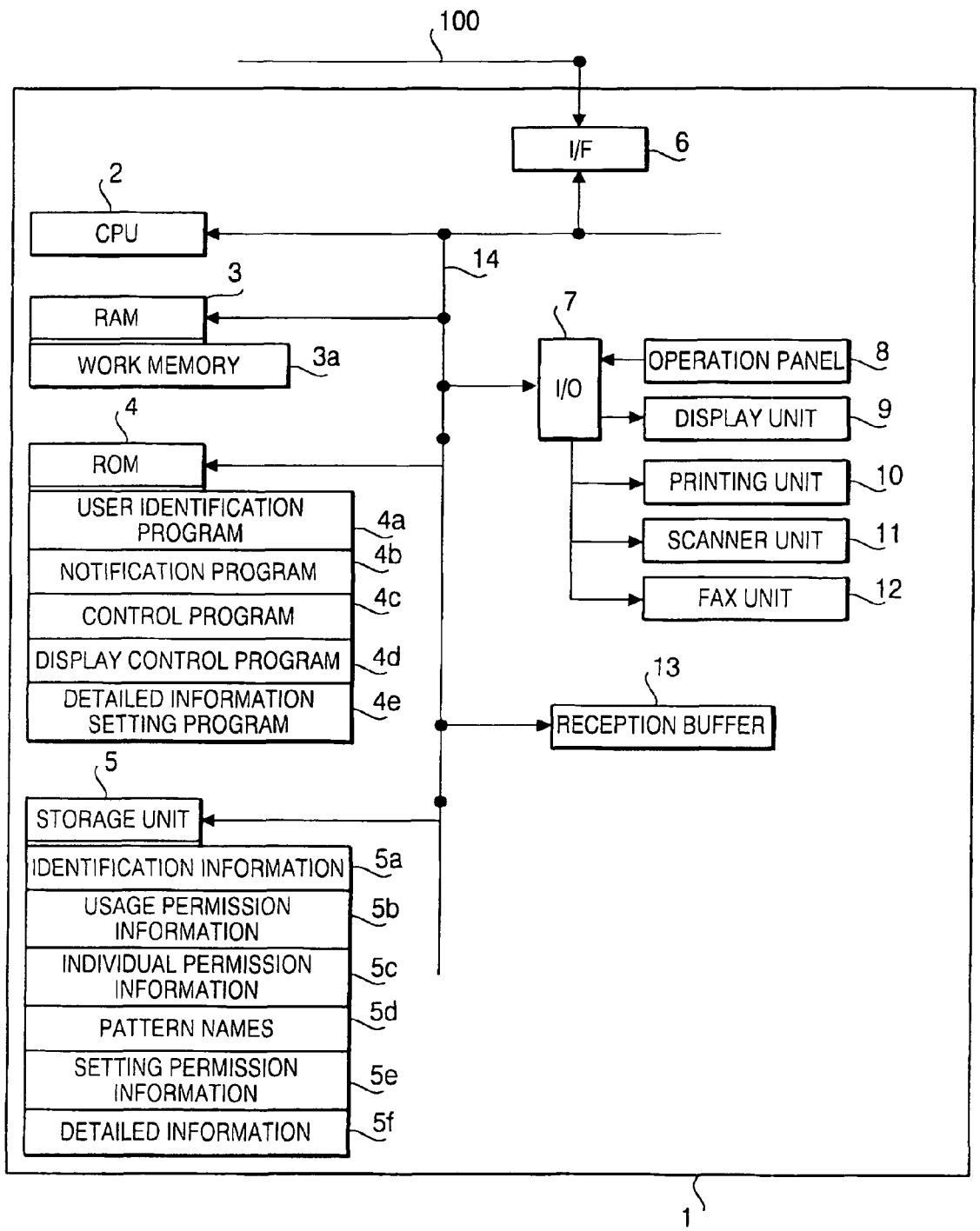
FIG. 1 is a block diagram showing the electrical configuration of a peripheral device 1 in accordance with an embodiment of the present invention.

In accordance with an aspect of the present invention, there is provided a peripheral device having one or more functions, comprising: an input unit which lets a user input identification information; one or more function selection buttons placed on an operation panel each of which is previously associated with one of the functions and can be operated by the user for selecting the associated function; a usage permission information storing unit which previously stores usage permission information, indicating whether the use of each function has been permitted or not, while associating the usage permission information with the identification information on each user; and a notification unit which notifies the user whether the user is permitted to use each of the functions or not when the identification information is inputted by the user, by displaying the function selection buttons associated with functions that the user has been permitted to use and the function selection buttons associated with functions that the user has not been permitted to use in different styles discriminable from each other based on the usage permission information associated with the inputted identification information.

With the above configuration, when the identification information (ID, password, etc.) is inputted by the user for using the peripheral device, the function selection buttons associated with the usable functions (functions that the user has been permitted to use) and the function selection buttons associated with the unusable functions (functions that the user has not been permitted to use) are displayed in different styles (so that the user can discriminate the two groups of buttons from each other) based on the usage permission information (specifying the usable functions and the unusable functions in regard to each piece of identification information) previously stored in the usage permission information storing unit, by which the user can check and recognize the usable (permitted) functions at a glance. In conventional peripheral devices in which the names of the usable functions are displayed on a display unit (e.g. LCD), it is sometimes impossible to display all the function names at once when the screen size is small. In the above configuration in which the function selection buttons placed on the operation panel are lighted, blinked, etc., the user is notified of all the usable functions at once without being restricted by the size of the display screen. Further, while conventional peripheral devices, displaying data (characters, symbols, etc.) indicating whether each user can use each function or not on a display unit and storing such data (character data, symbol data, etc.) necessary for the display in a storage unit, need relatively large memory space for the storage of the data, the peripheral device in accordance with the present invention (Oust storing information on whether each user can use each function or not) can achieve equivalent display with relatively small memory space. Furthermore, in a peripheral device originally having keys (buttons) for the function selection on the operation panel, it is unnecessary to add components specifically for the notification of the permitted functions since the keys can be used also for the notification.

Specifically, each of the function selection buttons may be provided with a corresponding light emitting element, and the notification unit may light or blink the light emitting elements corresponding to the function selection buttons regarding the functions that the user has been permitted to use without lighting the light emitting elements corresponding to the function selection buttons regarding the functions that the user has not been permitted to use.

Specifically, each of the light emitting elements may be installed inside each of the function selection buttons.

Preferably, the peripheral device may further comprise a pattern information storing unit which stores one or more different pieces of individual permission information representing a permission/prohibition combination pattern of the functions while storing each pattern name previously associated with each of the permission/prohibition combination patterns and having a smaller information amount than the individual permission information. The usage permission information storing unit previously stores information on correspondence between the identification information on each user and one of the pattern names.

With the above configuration, memory consumption for memorizing the permission/prohibition of each function for each user can be saved even when a large number of users are registered. If the information indicating whether the use of each of the functions has been permitted or not (individual permission information) is stored for each piece of identification information (i.e. stored for each user), the amount of the information can get extremely large as the number of users increases. To avoid this problem, in the above configuration, different pieces of individual permission information (indicating different permission/prohibition combination patterns of the functions) are stored in the pattern information storing unit while previously associating the permission/prohibition combination patterns with pattern names, respectively. Incidentally, the "pattern name" is assumed to be information having a smaller information mount than the individual permission information. Thus, the pattern name can be a pattern number, for example. By storing the identification information on each user while associating it with one of the pattern names, the total amount of information (representing the permission/prohibition of each function for each user) can be minimized even when a large number of users (i.e. a lot of identification information) are registered.

Preferably, the functions of the peripheral device include at least one of a copy function, a FAX function and a scanner function, and the function selection buttons include one or more buttons provided corresponding to the copy function, FAX function and/or scanner function, respectively.

With the above configuration, when the identification information is inputted by the user, each function selection button (among a copy function selection button, a FAX function selection button and/or a scanner function selection button) regarding a function that the user has been permitted to use is displayed in a style discriminable from function selection buttons regarding functions not permitted to the user, by which the user can check and recognize whether each of the copy function, FAX function and/or scanner function is usable or not at a glance.

Preferably, the peripheral device further comprises: a menu button which is operated by the user for setting detailed information regarding the functions; a display unit which displays at least names of the functions when the menu button is operated by the user while displaying a detailed information setting screen for the setting of the detailed information according to an operation by the user; and a display control unit which controls the display unit so as to display the names of the functions that the user has been permitted to use on the detailed information setting screen without displaying the names of the functions that the user has not been permitted to use on the detailed information setting screen based on the usage permission information associated with the inputted identification information.

With the above configuration, when the menu button (for the setting of the detailed information regarding the functions) is operated by the user, the display unit displays at least the names of the functions and displays the detailed information setting screen for the setting of the detailed information according to an operation by the user. On the detailed information setting screen, the display of the function names is not made for the unusable functions. Therefore, the user is automatically prohibited from making the detailed information setting of the unusable functions (functions that the user has not been permitted to use). Thanks to the user-friendly display of the function names on the detailed information setting screen, the user is prevented from erroneously and uselessly selecting an unusable function for the detailed information setting.

Preferably, the display unit does not display the names of the functions that the user has not been permitted to use when the menu button is operated by the user.

With the above configuration, the user is automatically prevented from erroneously and uselessly selecting an unusable function (functions that the user has not been permitted to use) for the detailed information setting.

Preferably, the usage permission information storing unit further stores setting permission information, indicating whether setting of each setting item of the detailed information has been permitted or not, while associating the setting permission information with the identification information on each user. The detailed information setting screen is configured to be capable of displaying the setting items of the detailed information. The display control unit controls the display unit so as to display the setting items that the user has been permitted to set on the detailed information setting screen without displaying the setting items that the user has not been permitted to set based on the setting permission information associated with the inputted identification information.

With the above configuration, when each setting item exists as detailed information regarding a function, for example, whether the setting of each setting item has been permitted or not can be memorized as the setting permission information while associating it with the identification information on each user. Based on the setting permission information associated with the identification information inputted by the user, permitted setting items (setting items that the user has been permitted to set) can be displayed on the detailed information setting screen without displaying the prohibited setting items (setting items that the user has not been permitted to set) on the detailed information setting screen, by which the detailed information setting screen can be made easy to understand and the operability can be enhanced.

Preferably, the peripheral device further comprises one or more individual setting buttons placed on the operation panel each of which is previously associated with one of the functions and can be operated by the user for setting detailed information regarding the associated function. The notification unit displays the individual setting buttons regarding the functions that the user has been permitted to use and the individual setting buttons regarding the functions that the user has not been permitted to use in different styles discriminable from each other based on the usage permission information associated with the inputted identification information.

With the above configuration, the individual setting buttons (each of which is previously associated with one of the functions and can be operated by the user for setting detailed information regarding the associated function) is placed on the operation panel, and the individual setting buttons regarding the permitted functions and the individual setting buttons regarding the prohibited functions (functions that the user has not been permitted to use) are displayed differently from each other, by which the user is allowed to easily recognize and discriminate between usable individual setting buttons and unusable individual setting buttons.

Specifically, each of the individual setting buttons may be provided with a corresponding light emitting element, and the notification unit may light or blink the light emitting elements corresponding to the individual setting buttons regarding the functions that the user has been permitted to use without lighting the light emitting elements corresponding to the individual setting buttons regarding the functions that the user has not been permitted to use.

Specifically, each of the light emitting elements is installed inside each of the individual setting buttons.

When the peripheral device has a FAX function, the individual setting buttons may include a resolution button which is operated by the user for setting document scanning resolution in the FAX function, and the notification unit may display the resolution button in a style indicating that the use of the resolution button is permitted when the use of the FAX function has been permitted to the user.

With the above configuration, users who are permitted to use the FAX function can easily recognize that the use of the resolution button (i.e. the setting of the document scanning resolution) is also permitted.

When the peripheral device has a copy function, the individual setting buttons may include a contrast button which is operated by the user for setting contrast in the copy function, and the notification unit may display the contrast button in a style indicating that the use of the contrast button is permitted when the use of the copy function has been permitted to the user.

With the above configuration, users who are permitted to use the copy function can easily recognize that the use of the contrast button (i.e. the setting of the contrast) is also permitted.

When the peripheral device has at least one of a copy function and a FAX function, the individual setting buttons may include a color button which is operated by the user for setting color in the copy function or the FAX function, and the notification unit may display the color button in a style indicating that the use of the color button is permitted when the use of the copy function or the FAX function has been permitted to the user.

With the above configuration, users who are permitted to use the copy function or the FAX function can easily recognize that the use of the color button (i.e. the color setting) is also permitted.

Embodiment

Referring now to the drawings, a description will be given in detail of a preferred embodiment in accordance with the present invention.

FIG. 1 is a block diagram showing the electrical configuration of a peripheral device 1 in accordance with an embodiment of the present invention. The peripheral device 1 includes a CPU (Central Processing Unit) 2, a RAM (Random Access Memory) 3 having work memory 3a, a ROM (Read Only Memory) 4 storing various programs, a bus line 14, an input/output unit 7 (indicated as "I/O" in FIG. 1), a storage unit 5, a communication interface 6 (indicated as "I/F" in FIG. 1) connected to a communication network 100, and a reception buffer memory 13 for temporarily storing print control data received from the communication network 100. An operation panel 8 (including a touch panel, push button switches and/or numeric keys), a display unit 9 (implemented by an LCD (Liquid Crystal Display), for example), and a printing unit 10 (implemented by a well-known printing mechanism such as an inkjet printing mechanism, laser printing mechanism, thermal transfer printing mechanism or dot impact printing mechanism) are connected to the input/output unit 7. The printing unit 10 is used for a print function (of executing printing according to a print instruction issued by a personal computer (unshown) connected to the communication network 100) and a well-known copy function. Further, a scanner unit 11 (for scanning an image on a document for the copy function or for FAX transmission executed by a FAX function) and a FAX unit 12 (for executing FAX transmission/reception control) are also connected to the input/output unit 7. The operations of the printing unit 10, the scanner unit 11 and the FAX unit 12 are well-known operations, which are controlled by the CPU 2 by loading a control program 4c from the ROM 4 into the work memory 3a of the RAM 3 and executing the control program 4c in the work memory 3a.

The storage unit 5 (implemented by a hard disk, for example) stores identification information 5a, usage permission information 5b, individual permission information 5c, pattern names 5d, setting permission information 5e and detailed information 5f. The contents of these pieces of information 5a-5f will be explained in detail later. Meanwhile, the ROM 4 stores a user identification program 4a, a notification program 4b, the control program 4c, a display control program 4d and a detailed information setting program 4e. The user identification program 4a stored in the ROM 4 is a program for judging whether a user inputting identification information (password, etc.) through the operation panel 8 is a registered user or not and identifying the user by comparing the inputted identification information with the identification information 5a already registered in the storage unit 5. The notification program 4b is a program for lighting (or blinking) each function selection button (explained later) regarding a permitted function (function that the user is permitted to use) while not lighting each function selection button regarding a prohibited function (function that the user is not permitted to use) based on the usage permission information 5b. The control program 4c is a program for controlling the peripheral device 1 so that a function corresponding to a function selection button selected by the user is executed only when the selected function selection button is a button regarding a permitted function (that is, only when the user is permitted to use the function corresponding to the selected function selection button) based on the usage permission information 5b. The display control program 4d is a program for controlling the display unit 9 so as to display the names of the permitted functions (functions that the user is permitted to use) on the display unit 9 without displaying the names of prohibited functions (functions that the user is not permitted to use) based on the identification information 5a and the usage permission information 5b regarding the user when a menu button (explained later) is operated by the user. The detailed information setting program 4e is a program for setting or changing the detailed information 5f according to an operation by the user. The user identification program 4a, the notification program 4b, the control program 4c, the display control program 4d and the detailed information setting program 4e are executed by the CPU 2 in the work memory 3a of the RAM 3, by which user notification (notification to the user) and display control in this embodiment (explained in detail later) are realized.

Figure 2:
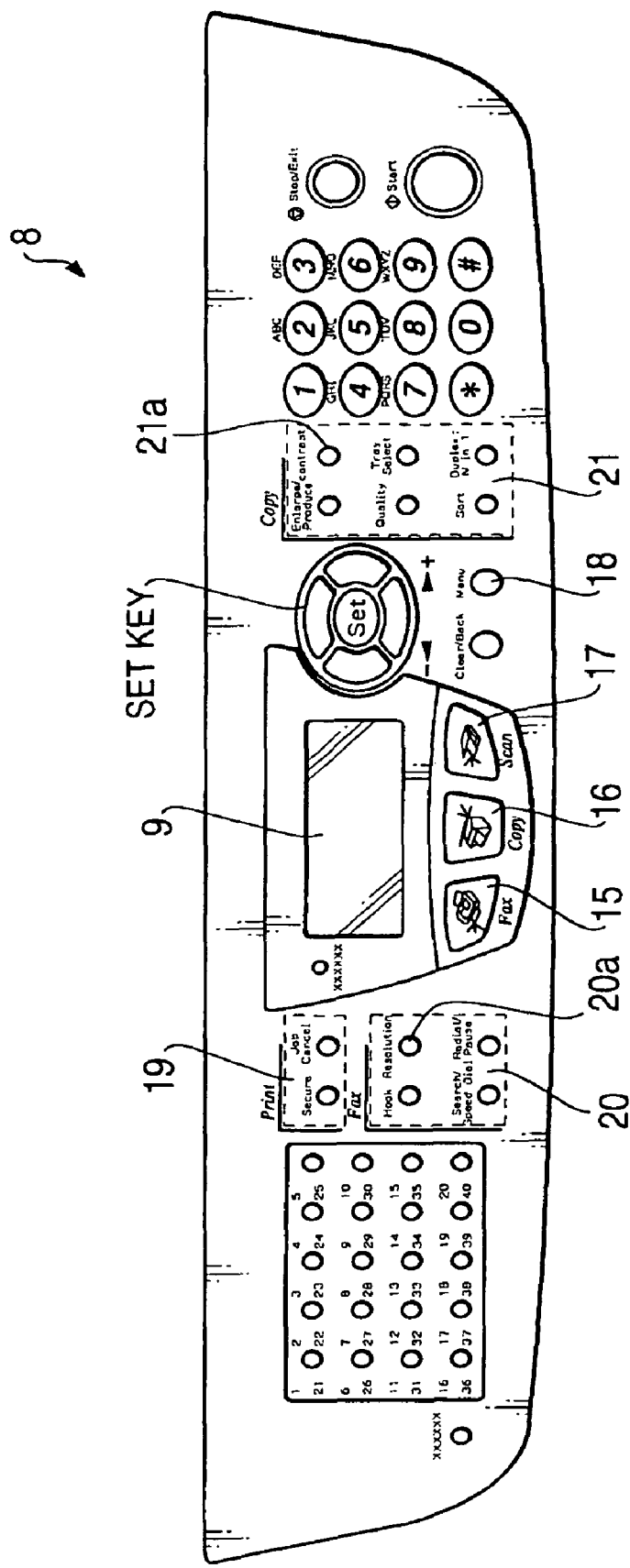
FIG. 2 is a schematic diagram showing an example of an operation panel of the peripheral device of FIG. 1.

FIG. 2 is a schematic diagram showing an example of the operation panel 8 of the peripheral device 1 of this embodiment. On the operation panel 8, the display unit 9 (implemented by an LCD) is placed at the center, and a FAX function selection button 15, a copy function selection button 16 and a scanner function selection button 17 are placed below (in front of) the display unit 9. Each function (FAX function, copy function, scanner function) can be executed (activated) by pressing the function selection button (15, 16, 17) regarding the function on condition that the user has been permitted to use the function. To the left of the display unit 9, print individual setting buttons 19 are placed for letting the user make individual settings regarding a job when the printing is executed by the peripheral device 1 according to an instruction from a device (e.g. personal computer) connected to the communication network 100. The print individual setting buttons 19 include, for example, a button to be pressed for canceling a job that has already been ordered and a button to be pressed for printing a message indicating that the printed document includes classified information. Below (in front of) the print individual setting buttons 19, FAX individual setting buttons 20 are placed for letting the user make individual settings when the FAX function is executed by the peripheral device 1. The FAX individual setting buttons 20 include, for example, a resolution button 20a to be pressed for changing the scanning resolution employed for the scanning of a document to be transmitted and a button to be pressed for searching the aforementioned detailed information 5f for a destination telephone number (FAX number). To the right of the display unit 9, copy individual setting buttons 21 are placed for letting the user make individual settings when the copy function is executed by the peripheral device 1. The copy individual setting buttons 21 include, for example, a contrast button 21a to be pressed for changing and adjusting the contrast in the copy output, a button to be pressed for selecting an output tray, etc. To the right of the copy individual setting buttons 21, the numeric keys are placed for letting the user input a personal identification number before the use of the peripheral device 1, letting the user input a FAX number, etc. Further, to the lower right of the display unit 9, the aforementioned menu button 18 (to be pressed for setting detailed information regarding each function) is placed. When the menu button 18 is pressed by the user, a screen for setting the detailed information regarding each function is displayed on the display unit 9. The details of the screen will be described later.

Figure 3:
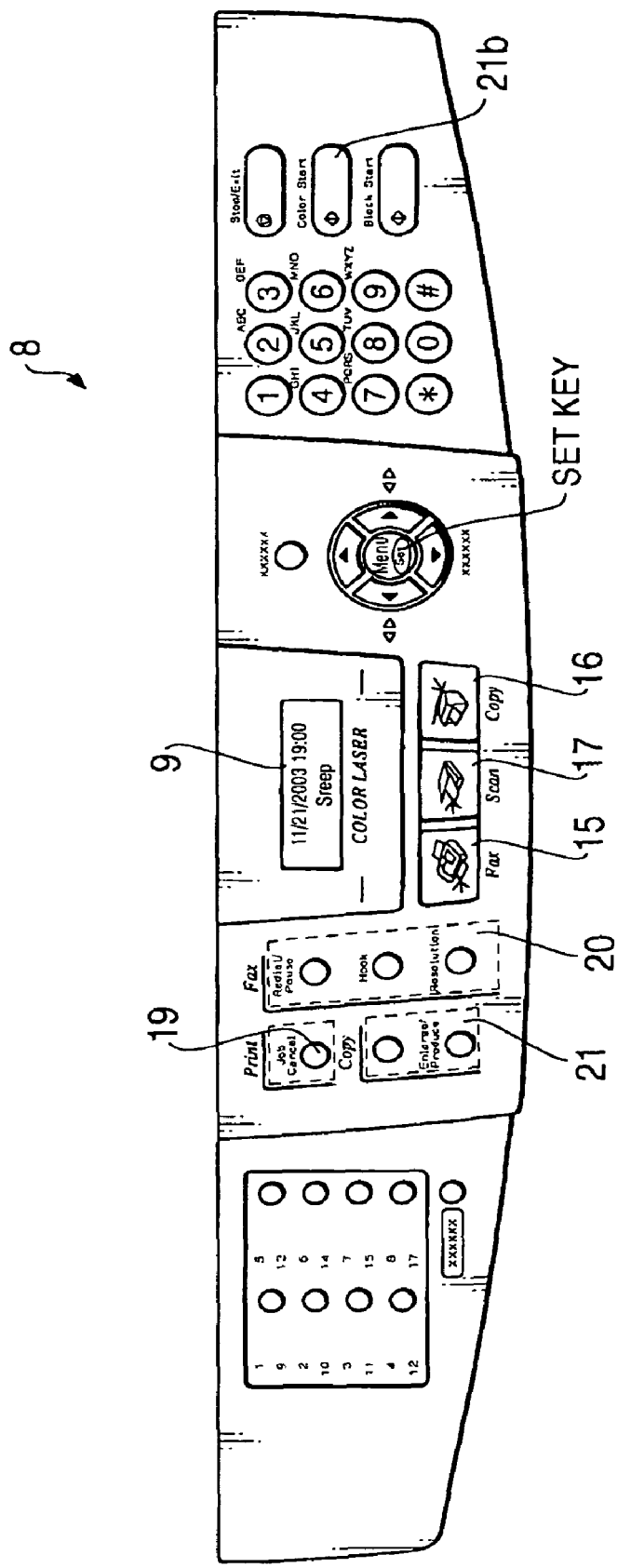
FIG. 3 is a schematic diagram showing another example of the operation panel.

FIG. 3 is a schematic diagram showing another example of the operation panel 8. The operation panel 8 shown in FIG. 3 (operation panel for a peripheral device supporting colors or having a color function) is provided with a color designation button 21b as an individual setting button. When the color designation button 21b is pressed by the user, a color setting (color function) is enabled. Specifically, color copy is designated and enabled when the currently selected function is the copy function, while color FAX (color scanning) is designated and enabled when the currently selected function is the FAX function. Similarly to the operation panel 8 of FIG. 2, the FAX function selection button 15, the copy function selection button 16 and the scanner function selection button 17 are placed below (in front of) the display unit 9. Further, the print individual setting button 19, the FAX individual setting buttons 20 and the copy individual setting buttons 21 are placed to the left of the display unit 9 to be operated by the user as needed.

Figures 4A, 4C:
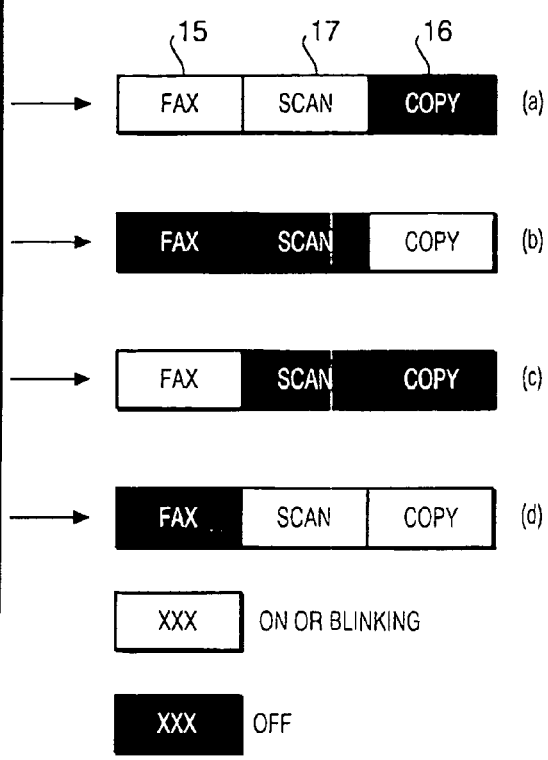
FIG. 4A is a table showing an example of the contents of usage permission information.
FIG. 4C is a table showing an example of information associating each user name with identification information.

Next, the usage permission information 5b will be explained referring to FIGS. 4A-4C. As shown in FIG. 4C, the name and the identification information (password) of each user have previously been memorized. The user inputting the identification information is identified based on the inputted identification information. As shown in FIG. 4A, the usage permission information 5b is information stored in the storage unit 5 to indicate whether or not each user has been permitted to use each of the multiple functions (FAX function, scanner function, copy function). In the example of FIG. 4A, the user #1 has been permitted to use the FAX function and the scanner function, without permission for the use of the copy function. The user #2 has been permitted to use the copy function only, without permission for the use of the FAX function or the scanner function. By the execution of the notification program 4b, the usage permission information 5b regarding the identification information 5a on the current user is read out from the storage unit 5 and the function selection button(s) corresponding to the permitted function(s) is(are) displayed (lighted) to be discriminated from the function selection button(s) corresponding to the prohibited function(s). Specifically, each function selection button 15-17 is provided with a light emitting element such as an LED (Light-Emitting Diode), and each function selection button regarding each permitted function is lighted (or blinked) without lighting each function selection button regarding each prohibited function as shown in FIG. 4B. For example, since the user #1 is permitted to use the FAX function and the scanner function only, the FAX function selection button 15 and the scanner function selection button 17 are lighted without lighting the copy function selection button 16. By such display of the function selection buttons 15, 16 and 17, the user #1 is notified of the permitted functions. When the lighted function selection button 15 or 17 is pressed by the user #1, the function (FAX function or scanner function)

corresponding to the pressed button is executed by the control program 4c. On the other hand, when the unlighted function selection button 16 is pressed by the user #1, the corresponding function (copy function) is not executed. Incidentally, each light emitting element may either be installed in each function selection button as above or placed beside each function selection button on the operation panel 8 to correspond to each button.

As above, by providing each function selection button 15-17 with a corresponding light emitting element and selectively lighting function selection buttons regarding the permitted functions, a user-friendly peripheral device with high usability can be realized. In the conventional peripheral device configured to generate a display screen including the names (only) of the permitted functions for each user and memorize the display screens for all the users, a lot of memory space is necessary for notifying each user of the permitted functions. The peripheral device 1 of this embodiment (employing the function selection buttons 15-17 for the selection of the functions and notifying the user of the usable (permitted) functions by lighting corresponding buttons) has only to store the correspondence between the identification information 5a (user name, password, etc.) and the usage permission information 5b, by which the memory consumption can be saved.

Further, in the conventional case where the names of the permitted functions are displayed for notifying the user of the permitted functions, when the screen having a limited display area is incapable of displaying all the names of the permitted functions at once, the user has to perform operations for the scroll display, switching display, etc. for checking the usable (permitted) functions and thereafter operate a selection key, that is, multiple user operations are necessary for the selection of a desired function. On the other hand, in this embodiment notifying the user of the permitted functions by lighting (or blinking) corresponding function selection buttons on the operation panel 8, the user can check and recognize the usable (permitted) functions at a glance, and the selection of a desired function can be made by only one user operation (pressing a function selection button).

Furthermore, in a peripheral device originally having keys (buttons) for the function selection on the operation panel, it is unnecessary to add components specifically for the notification of the permitted functions since the keys can be used also for the notification.

Next, another method of memorizing the permission/prohibition of each function for each user employed in this embodiment will be described referring to FIGS. 5A-5C. First, as shown in FIG. 5A, multiple pieces of individual permission information 5c, each of which represents a permission/prohibition combination pattern of the functions, are memorized. For example, when the peripheral device 1 has three functions (FAX, scanner, copy) as in this embodiment, there are eight ($2^3$) permission/prohibition combination patterns. The eight combination patterns are previously memorized while associating each of them with a pattern name 5d. The information amount of the pattern name 5d is assumed to be smaller than that of the individual permission information 5c. The pattern name 5d is memorized for each piece of identification information 5a (i.e. for each user) as shown in FIG. 5C. In short, in this embodiment, the pattern name 5d is stored in the storage unit 5 for each piece of identification information 5a instead of storing the individual permission information 5c for each piece of identification information 5a, by which the total amount of information that has to be stored in the storage unit 5 can be reduced compared to the method of FIG. 4A memorizing the permission/prohibition of each of the functions for each piece of identification information 5a. By the above configuration, the memory consumption can be saved even when a lot of users are registered. Incidentally, the pattern name 5d can be a pattern number, for example. In this embodiment, the notification program 4b first reads out the pattern name 5d corresponding to the identification information 5a on the current user (see FIG. 5C), reads out the individual permission information 5c corresponding to the pattern name 5d (see FIG. 5A), and thereby lights the function selection buttons regarding the functions that the user is permitted to use. For example, for the user #3 for which the pattern #5 has been registered (see FIG. 5C), a piece of individual permission information 5c corresponding to the pattern #5 is read out and the ON/OFF control of the function selection buttons 15-17 is executed based on the individual permission information 5c (only the FAX function selection button 15 is lighted for the user #3) as shown in FIG. 5B. Incidentally, the peripheral device 1 does not necessarily have to memorize all the combination patterns, that is, the peripheral device 1 may be configured to memorize some of the patterns (e.g. patterns of high frequency of use).

Next, screens which are displayed for the setting of the detailed information 5f regarding one-touch dialing registration, speed dialing registration, etc. of the FAX function will be explained referring to FIG. 6. First, when the menu button 18 (see FIG. 2) is pressed by the user, an initial screen 23, indicating the name 22 of each function that the user is permitted to use, is displayed on the display unit 9. For example, when the user is permitted to use all the three functions (FAX function, copy function, scanner function), all the names 22 of the three functions are displayed as shown in FIG. 6D. Subsequently, when a desired function is selected and a "SET" key is pressed by the user, screens for setting the detailed information 5f (detailed information setting screens 24) are displayed step by step as shown in FIGS. 6E and 6F. On the detailed information setting screens 24, setting items 25 representing the contents of the detailed information 5f are displayed. The user can set or change a desired piece of detailed information 5f by selecting one of the setting items 25.

Figure 7A:
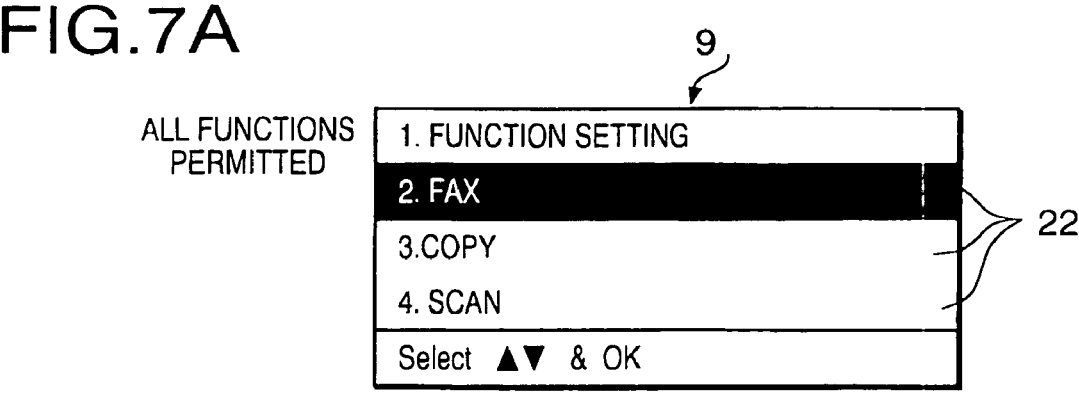
FIGS. 7A-7C are schematic diagrams showing examples of an initial screen which is displayed for setting the detailed information.
Figure 7B:
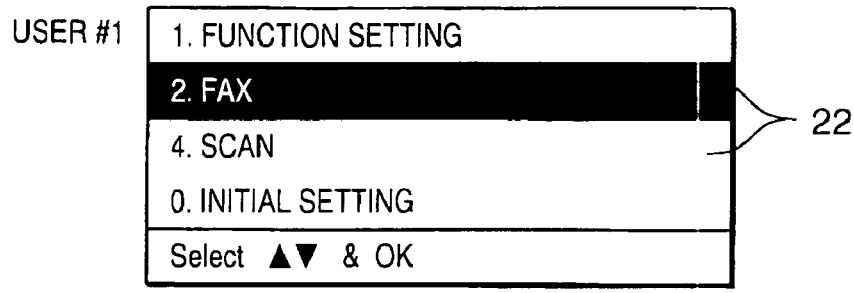
Figure 7C:
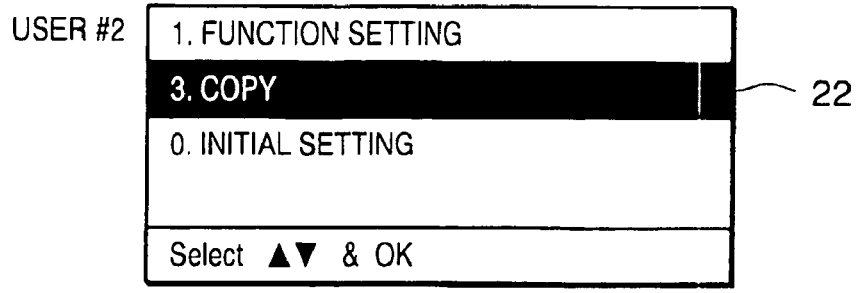

FIGS. 7A-7C are schematic diagrams showing examples of the initial screen 23. When the menu button 18 is pressed by the user who has been identified as a registered user based on the entry of the identification information, the name 22 of each function that the user is permitted to use is displayed on the display unit 9 without displaying the name of each function that the user is prohibited to use. For example, in the case of a user permitted to use all the functions, all the names 22 of the functions are displayed as shown in FIG. 7A. In the case of the user #1 permitted to use the FAX function and the scanner function only, the display is made as shown in FIG. 7B. In the case of the user #2 permitted to use the copy function only, the display is made as shown in FIG. 7C. With such a display leaving out the names of prohibited functions, the screen can be simplified and the user can easily recognize the permitted functions. Incidentally, the display control explained above is executed by the CPU 2 by running the display control program 4d stored in the ROM 4. In short, the initial screen 23 is modified depending on the user so that only, the names 22 of the functions that the user is permitted to use are displayed on the display unit 9, by reading out the names of the permitted functions based on the identification information 5a inputted by the user and the usage permission information 5b corresponding to the inputted identification information 5a.

Next, the setting permission information 5e will be explained referring to FIG. 8. As shown in FIG. 8, a plurality of items of detailed setting (detailed setting items) are memorized while being classified into three levels (LEVEL 1-LEVEL 3). Specifically, the usage permission information 5b is memorized for each user (LEVEL 1), and a plurality of function setting items regarding each permitted function (e.g. FAX function) and information indicating whether the user has been permitted to change each function setting item or not are memorized as function setting item information 5b' (LEVEL 2). Further, a plurality of detailed setting items regarding each function setting item (e.g. FAX reception setting, FAX transmission setting, telephone directory registration, communication setting) and information indicating whether the user has been permitted to change each detailed setting item or not are memorized as the setting permission information 5e (LEVEL 3).

As shown in FIGS. 6A-6E, the peripheral device 1 of this embodiment displays setting items 25 regarding detailed information that the user has been permitted to set or change on the detailed information setting screen 24 (without displaying setting items regarding detailed information that the user has not been permitted to set or change) based on the setting permission information 5e. With such a display leaving out items that the user can not set or change, the screen can be simplified and the user can easily make the settings on the screen.

Figure 9:
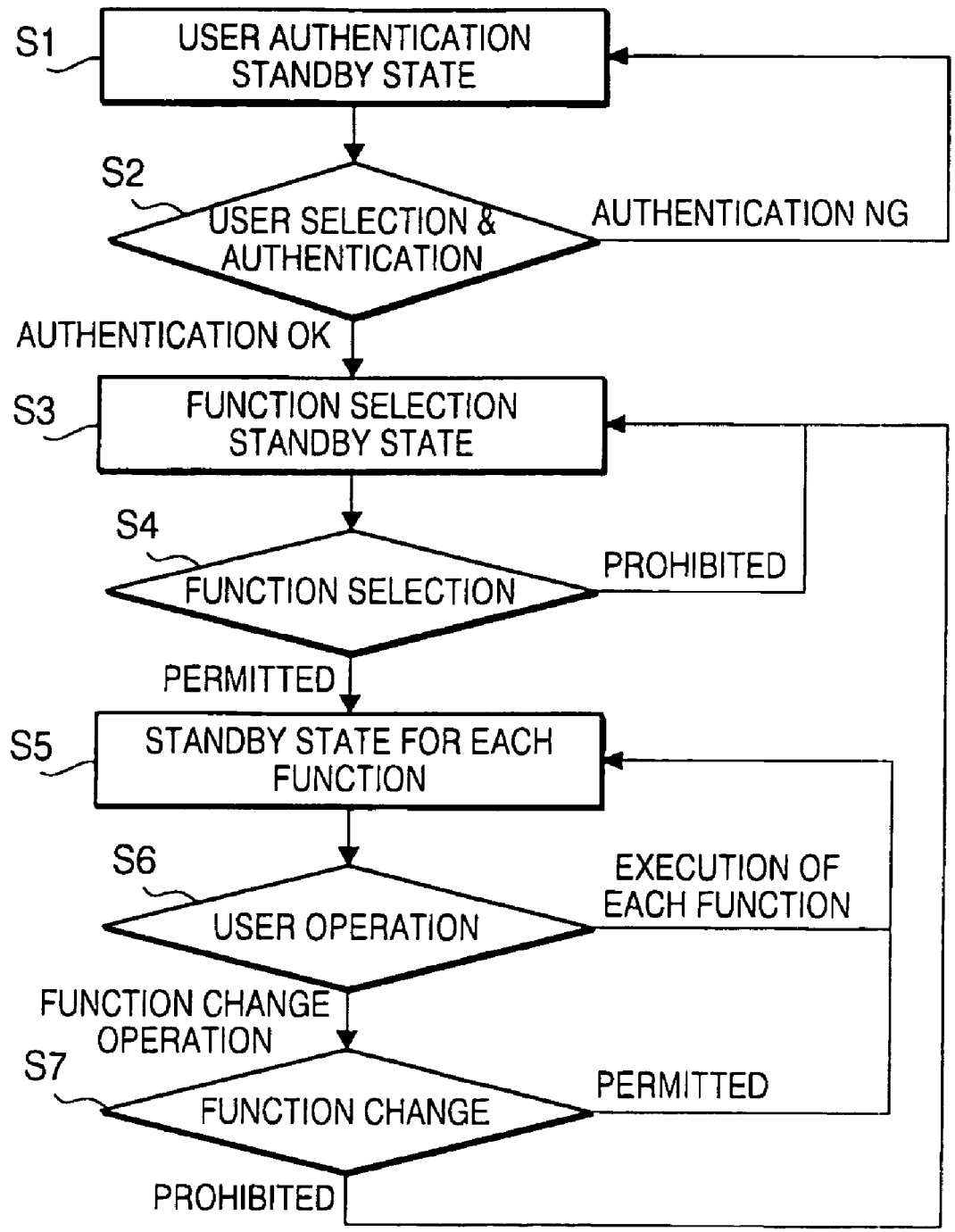
FIG. 9 is a flowchart showing the operation of the peripheral device in accordance with the embodiment.

In the following, the operation of the peripheral device 1 in accordance with this embodiment will be described referring to a flowchart of FIG. 9. First, in a user authentication standby state (S1), the CPU 2 waits for an entry of the identification information (password) by the user. When the identification information is inputted by the user, the CPU 2 judges whether the user is a registered user or not by comparing the inputted identification information with the identification information 5a stored in the storage unit 5 (S2). When the authentication can not be completed normally (e.g. when the identification information is erroneously inputted by the user) (S2: AUTHENTICATION NG), the CPU 2 returns to the step S1. On the other hand, when the authentication is completed normally (S2: AUTHENTICATION OK), the CPU 2 advances to a function selection standby state (S3). In the function selection standby state, the CPU 2 waits until one of the function selection buttons (e.g. FAX function selection button 15, copy function selection button 16 or scanner function selection button 17) is pressed by the user. In the step S3, only function selection buttons regarding the functions that the user is permitted to use are lighted (without lighting function selection buttons regarding the prohibited functions) based on the usage permission information 5b associated with the identification information 5a which has been authenticated normally.

When one of the function selection buttons 15-17 is pressed by the user, the CPU 2 judges whether the pressed function selection button is a button regarding a permitted function or not based on the usage permission information 5b (S4). When permitted (S4: PERMITTED), the CPU 2 advances to step S5 and executes the selected function. When not permitted (S4: PROHIBITED), the CPU 2 returns to the function selection standby state of S3. In this case where a prohibited function is selected by the user, the CPU 2 may give a warning (beep, display of an error message, etc.) to the user.

In step S6, operations for the selected function are performed by the user. For example, when the FAX function has been selected in S4, the user in S6 performs operations for the FAX transmission to a particular destination. When FAX transmission to another destination is necessary (S6: EXECUTION OF EACH FUNCTION), the process temporarily shifts to a standby state (S5) and thereafter the user operation for the FAX function is performed again in S6. When the function is switched to another function (e.g. copy function) by the user (i.e. when another function selection button is pressed by the user) in the step S6 (S6: FUNCTION CHANGE OPERATION), the CPU 2 advances to step S7 and judges whether the user has been permitted to use the newly selected function or not. When permitted (S7: PERMITTED), the CPU 2 returns to the step S5 to execute the newly selected function. When not permitted (S7: PROHIBITED), the CPU 2 returns to the step S3 (function selection standby state). Incidentally, the lighting of the function selection buttons regarding the permitted functions (made in S3) is continued throughout the steps S3-S7.

Next, the operation of the peripheral device 1 of this embodiment will be described in more detail referring to flowcharts of FIGS. 10 and 11, wherein the step numbers already used in the flowchart of FIG. 9 will be used for the same steps and repeated explanation thereof is omitted for brevity. First, the steps S1 and S2 are executed similarly to those in FIG. 9. When the authentication of the user is completed normally (AUTHENTICATION OK), the CPU 2 advances to step S2a and acquires information on usable functions. Specifically, the CPU 2 executing the control program 4c reads out the usage permission information 5b from the storage unit 5 and thereby acquires the information on the functions that the current user is permitted to use. Subsequently, the CPU 2 advances to step S2b and executes a usable function selection button blinking process. In this step, the CPU 2 blinks function selection buttons regarding the functions that the user is permitted to use, without lighting function selection buttons regarding the prohibited functions.

Subsequently, the CPU 2 advances to the step S3 (function selection standby state) and waits until one of the function selection buttons 15-17 (see FIG. 2) is pressed by the user. When a usable function selection button is pressed by the user (S4: PERMITTED), the CPU 2 advances to step S4a and switches the pressed function selection button from the blinking state to a constantly lighting state, while lighting or blinking one or more individual setting buttons 19-21 (see FIG. 2 or 3) corresponding to the selected function (i.e. corresponding to the pressed function selection button). Subsequently, the CPU 2 advances to the step S5 (standby state for each function) and waits until an operation (e.g. for the execution of the selected function) is performed by the user. In the next step S6, the CPU 2 judges whether the user operation is an operation for the execution of the function or the pressing of the menu button 18 (for the setting of the detailed information).

When the user operation is for the execution of the function (assumed here to be the FAX function, for example) in S6 (S6: EACH FUNCTION), the FAX function is executed according to operations by the user in step S6a. In the step S6a, when the FAX function is continued (S6a: EXECUTION OF EACH FUNCTION), the CPU 2 returns to the step S5 and temporarily stays in the standby state to wait for a user operation. When the function is switched to another function (i.e. when another function selection button is pressed by the user) in the step S6a (S6a: FUNCTION CHANGE OPERATION), the CPU 2 advances to the step S7. In the step S7, when the newly selected function is usable (permitted to the user) (S7: PERMITTED), the CPU 2 returns to the step S5 to execute the newly selected function. When not permitted (S7: PROHIBITED), the CPU 2 returns to the step S2b (usable function selection button blinking process).

In the step S6, when the user operation is the pressing of the menu button 18 (S6: MENU BUTTON), the process advances to the flow (1) shown in FIG. 11 and steps S8-S11 are executed for the setting of the detailed information. In the step S8, the CPU 2 acquires information on the permitted functions by reading out the usage permission information 5b corresponding to the identification information 5a authenticated in S2 from the storage unit 5 (see FIG. 1), and displays the names 22 of the permitted functions on the display unit 9 as shown in FIG. 6A, for example. In the next step S9, the name 22 of a function displayed on the display unit 9 (see FIG. 6A, for example) is selected by the user, by which the detailed information setting screens 24 regarding the selected function are displayed step by step. In the next step S10, the CPU 2 acquires detailed information that the user is permitted to set or change by reading out the setting permission information 5e from the storage unit 5 (see FIG. 1), and displays the setting items 25 regarding the detailed information (that the user is permitted to set or change) on the detailed information setting screens 24 as shown in FIGS. 6B and 6C, for example. The user can set or change desired pieces of detailed information by successively selecting desired setting items 25 displayed on the detailed information setting screens 24 (S11). When the user hopes to continue the detailed setting (to set the detailed information regarding another function) in S11 (S11: DETAILED SETTING CONTINUED), the process returns to the step S9 to let the user select a new function. When the detailed setting is completed (S11: SETTING END), the process returns to the step S5 in FIG. 10.

Figure 10:
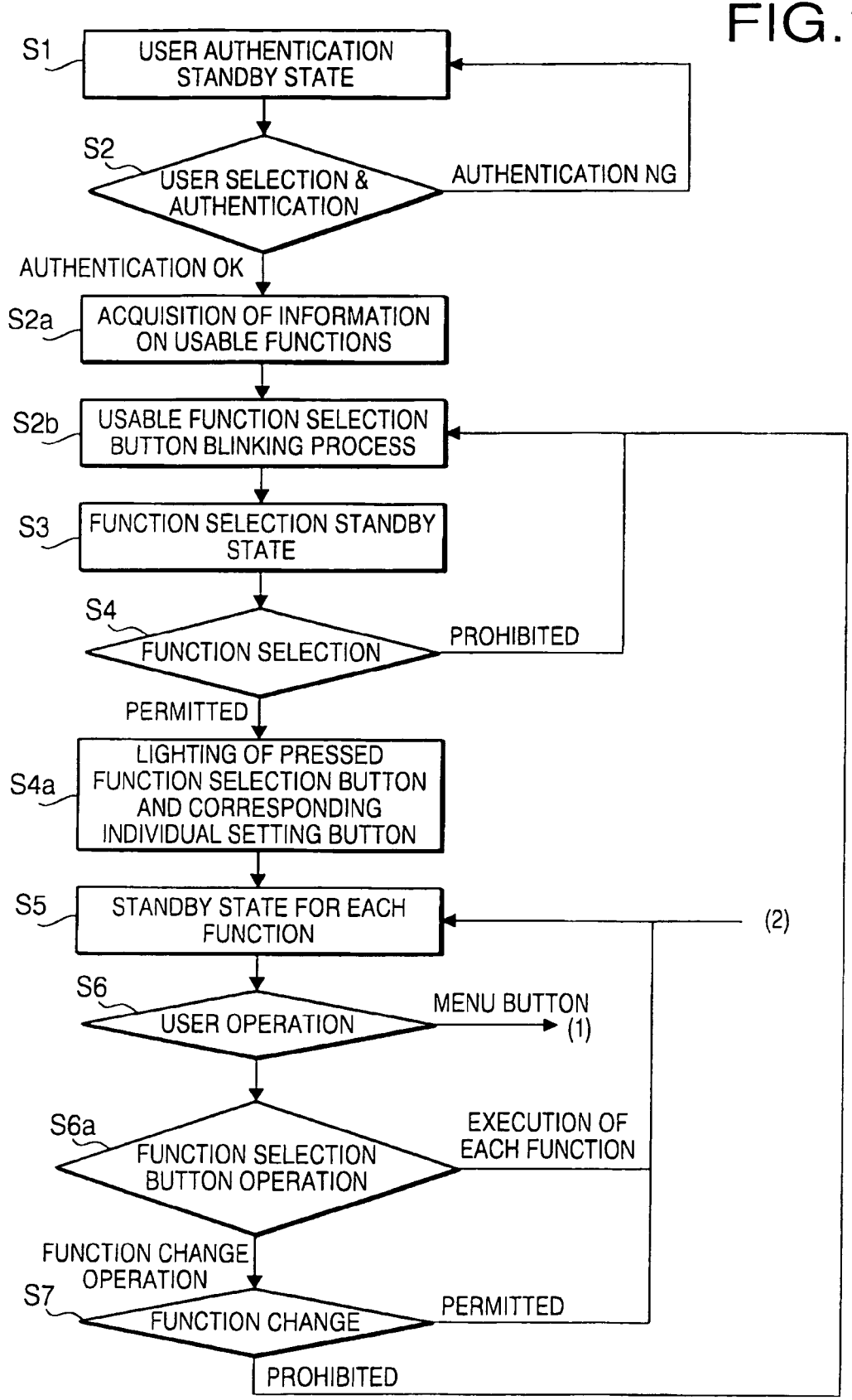
FIG. 10 is a flowchart showing the details of the operation of the peripheral device.
Figure 11:
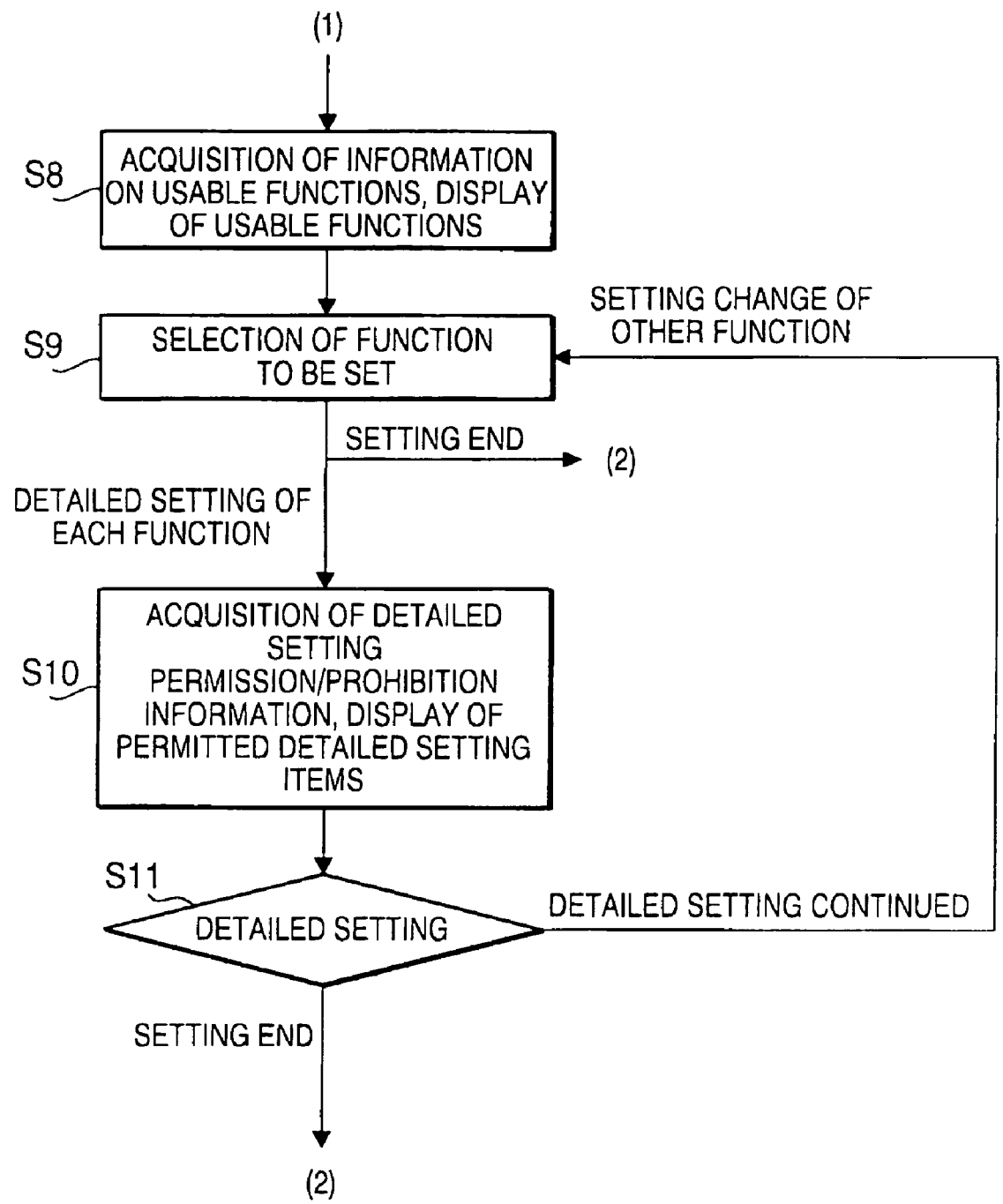
FIG. 11 is a flowchart showing a process (for the setting of the detailed information) included in the operation of FIG. 10.

When the authenticated user finishes operating the peripheral device 1, the process of FIGS. 10 and 11 returns to the step S1. The returning to the step S1 may be conducted when a key (unshown) for specifying the end of user operation is pressed by the user or when a no-operation state (with no user operation) has continued for a prescribed time period.

The transition to the flow (1) (steps S8-S11 for the setting of the detailed information) may be made not only from the step S6 but also from the step S3 when the menu button 18 is pressed by the user.

Incidentally, while the peripheral device 1 in the above embodiment has the three functions (FAX function, copy function and scanner function), the number of functions is not restricted to three (The present invention is applicable to peripheral devices having one or more functions.) and the peripheral device 1 may of course be provided with other functions (other function selection buttons).

When there are two or more individual setting buttons corresponding to one permitted function, the peripheral device 1 in the above embodiment lights or blinks all the individual setting buttons corresponding to the permitted function. However, the peripheral device 1 may also be configured to light or blink some of such individual setting buttons. For example, when some setting items of the setting permission information 5e or the function setting item information 5b' coincide with setting items represented by (i.e. that can be set by pressing) some individual setting buttons, the lighting of such individual setting buttons may be controlled based on the current settings of the setting permission information 5e or the function setting item information 5b'. Specifically, as for the resolution button (individual setting button for setting the resolution) for the FAX function, when the permission/prohibition regarding the resolution can be set in the setting permission information 5e or the function setting item information 5b', the CPU 2 may refer to the setting regarding the resolution and light/blink the resolution button if the current user has been permitted to set or change the resolution while not lighting the resolution button if the user has not been permitted to set or change the resolution.

Further, in the case of a peripheral device having a touch panel on which the names of functions can be displayed so as to let the user select a function, the notification of the usable (permitted) functions can also be given to the user by displaying the names of the permitted functions and the names of the prohibited functions on the touch panel in different styles discriminable from each other.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

What is claimed is:

1. A peripheral device, comprising:
an input unit which allows a user to input identification information;
plural function selection buttons placed on an operation panel each of which is previously associated with one of the functions and is configured to be operated by the user for selecting the associated function;
a pattern information storing unit which stores one or more different pieces of individual permission information representing a permission/prohibition combination pattern of the functions while storing each pattern name previously associated with each of the permission/prohibition combination patterns and having a smaller information amount than the individual permission information;
a usage permission information storing unit which previously stores information on correspondence-between the identification information of each user and one of the pattern names; and
a notification unit configured, when the identification information is inputted by the user, to:
read out the pattern name corresponding to the identification information of the user from the usage permission information storing unit and the individual permission information corresponding to the pattern name from the pattern information storing unit, and
simultaneously notify the user which of the functions that the user is permitted to use and which of the functions that the user is not permitted to use, by simultaneously providing the function selection buttons associated with functions that the user has been permitted to use in a first state and the function selection buttons associated with functions that the user has not been permitted to use in a second state discriminable from the first state based on the individual permission information associated with the inputted identification information.

2. The peripheral device according to claim 1, wherein:
each of the function selection buttons is provided with a corresponding light emitting element, and
the notification unit lights or blinks the light emitting elements corresponding to the function selection buttons regarding the functions that the user has been permitted to use without lighting the light emitting elements corresponding to the function selection buttons regarding the functions that the user has not been permitted to use.

3. The peripheral device according to claim 2, wherein each of the light emitting elements is installed inside each of the function selection buttons.

4. The peripheral device according to claim 1,
wherein the functions of the peripheral device include at least one of a copy function, a FAX function and a scanner function, and
wherein the function selection buttons include one or more buttons corresponding to the copy function, FAX function and/or scanner function, respectively.

5. The peripheral device according to claim 1, further comprising:
a menu button which is operated by the user for setting detailed information regarding the functions;
a display unit which displays at least names of the functions when the menu button is operated by the user while displaying a detailed information setting screen for the setting of the detailed information according to an operation by the user; and
a display control unit which controls the display unit so as to display the names of the functions that the user has been permitted to use on the detailed information setting screen without displaying the names of the functions that the user has not been permitted to use on the detailed information setting screen based on the usage permission information associated with the inputted identification information.

6. The peripheral device according to claim 5, wherein the display unit does not display the names of the functions that the user has not been permitted to use when the menu button is operated by the user.

7. The peripheral device according to claim 5,
wherein the usage permission information storing unit further stores setting permission information, indicating whether setting of each setting item of the detailed information has been permitted, while associating the setting permission information with the identification information on each user,
wherein the detailed information setting screen is configured to display the setting items of the detailed information, and
wherein the display control unit controls the display unit so as to display the setting items that the user has been permitted to set on the detailed information setting screen without displaying the setting items that the user has not been permitted to set based on the setting permission information associated with the inputted identification information.

8. The peripheral device according to claim 1, further comprising plural individual setting buttons placed on the operation panel each of which is previously associated with one of the functions and is configured to be operated by the user for setting detailed information regarding the associated function,
wherein the notification unit provides the individual setting buttons regarding the functions that the user has been permitted to use in the first state and the individual setting buttons regarding the functions that the user has not been permitted to use in the second state discriminable from the first state based on the usage permission information associated with the inputted identification information.

9. The peripheral device according to claim 8,
wherein each of the individual setting buttons is provided with a corresponding light emitting element, and
wherein the notification unit performs one of lighting and blinking the light emitting elements corresponding to the individual setting buttons regarding the functions that the user has been permitted to use without lighting the light emitting elements corresponding to the individual setting buttons regarding the functions that the user has not been permitted to use.

10. The peripheral device according to claim 9, wherein each of the light emitting elements is installed inside each of the individual setting buttons.

11. The peripheral device according to claim 8,
wherein the functions of the peripheral device include a FAX function,
wherein the individual setting buttons include a resolution button which is operated by the user for setting document scanning resolution in the FAX function, and
wherein the notification unit provides the resolution button in a third state indicating that the use of the resolution button is permitted when the use of the FAX function has been permitted to the user.

12. The peripheral device according to claim 8,
wherein the functions of the peripheral device include a copy function,
wherein the individual setting buttons include a contrast button which is operated by the user for setting contrast in the copy function, and
wherein the notification unit provides the contrast button in a third state indicating that the use of the contrast button is permitted when the use of the copy function has been permitted to the user.

13. The peripheral device according to claim 8,
wherein the functions of the peripheral device include at least one of a copy function and a FAX function,
wherein the individual setting buttons include a color button which is operated by the user for setting color in the copy function or the FAX function, and
wherein the notification unit provides the color button in a third state indicating that the use of the color button is permitted when the use of the copy function or the FAX function has been permitted to the user.

* * * * *